(12) United States Patent
Viegas et al.

(10) Patent No.: US 10,402,442 B2
(45) Date of Patent: Sep. 3, 2019

(54) SEMANTIC SEARCH INTERFACE FOR DATA COLLECTIONS

(75) Inventors: Evelyne Viegas, Redmond, WA (US); Karin Koogan Breitman, Rio de Janeiro (BR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 160 days.

(21) Appl. No.: 13/152,293

(22) Filed: Jun. 3, 2011

(65) Prior Publication Data

US 2012/0310990 A1 Dec. 6, 2012

(51) Int. Cl.
*G06F 16/44* (2019.01)

(52) U.S. Cl.
CPC .................................. *G06F 16/44* (2019.01)

(58) Field of Classification Search
CPC ................................................ G06F 17/30058
USPC .................................................. 707/790–795
See application file for complete search history.

(56) References Cited

U.S. PATENT DOCUMENTS

| | | | |
|---|---|---|---|
| 6,523,026 B1 * | 2/2003 | Gillis | |
| 7,823,055 B2 * | 10/2010 | Sull et al. | 715/201 |
| 7,890,519 B2 | 2/2011 | Dettinger et al. | |
| 2002/0156774 A1 | 10/2002 | Beauregard et al. | |
| 2003/0050927 A1 * | 3/2003 | Hussam | 707/5 |
| 2003/0074369 A1 * | 4/2003 | Schuetze | G06F 17/3071 |
| 2003/0123737 A1 | 7/2003 | Mojsilovic et al. | |
| 2003/0208499 A1 * | 11/2003 | Bigwood | G06F 17/30716 |
| 2007/0073749 A1 | 3/2007 | Fan | |
| 2007/0143235 A1 * | 6/2007 | Kummamuru | G06F 17/30911 706/15 |
| 2007/0271265 A1 * | 11/2007 | Acharya et al. | 707/6 |
| 2007/0271287 A1 * | 11/2007 | Acharya | G06F 17/30598 |
| 2010/0070448 A1 * | 3/2010 | Omoigui | 706/47 |
| 2010/0125581 A1 * | 5/2010 | Peleg | G06F 17/30811 707/737 |
| 2011/0161375 A1 * | 6/2011 | Tedder et al. | 707/803 |
| 2011/0225167 A1 * | 9/2011 | Bhattacharjee | G06F 17/30595 707/747 |

(Continued)

FOREIGN PATENT DOCUMENTS

EP 1088281 A1 * 4/2001 ....... G06F 17/30713

OTHER PUBLICATIONS

Jing, et al., "Google Image Swirl: A Large-Scale Content-Based Image Browsing System", Retrieved at <<http://image-swirl.googlelabs.com/html/abstract.pdf>>, Jul. 19-23, 2010, p. 1.

(Continued)

*Primary Examiner* — Mark D Featherstone
*Assistant Examiner* — Navneet Gmahl
(74) *Attorney, Agent, or Firm* — Medley, Behrens & Lewis, LLC

(57) ABSTRACT

Described herein are technologies pertaining to automatically summarizing contents of a dataset and visualizing a summary of the dataset together with summaries of other datasets. A schema that defines the structure and content of a dataset is received, and pre-processing is undertaken on the schema to generate an enriched schema. Portions of the enriched schema are selected to generate a semantic summary of the schema, which is included with at least one exemplary entry of the dataset to generate a summary of the dataset.

20 Claims, 6 Drawing Sheets

(56) References Cited

U.S. PATENT DOCUMENTS

2012/0124478 A1* 5/2012 King et al. .................. 715/738
2013/0036117 A1* 2/2013 Fisher ............... G06F 17/30041
　　　　　　　　　　　　　　　　　　　　　　　　　　707/736

OTHER PUBLICATIONS

Ding, et al., "Semantic Web Portal: A Platform for Better Browsing and Visualizing Semantic Data", Retrieved at <<http://ivl.slis.indiana.edu/km/pub/2010-ding-et-al-swp.pdf>>, Proceedings of the International Conference on Active Media Technology, Aug. 28-30, 2010, pp. 1-9.

Chen, et al., "Schemr: a Schema Search Engine for Information Integration", Retrieved at <<http://disi.unitn.it/~p2p/RelatedWork/Matching/schemr_demo.pdf>>, 2009, pp. 1-3.

Wang, et al., "Q2Semantic: A Lightweight Keyword Interface to Semantic Search",Retrieved at <<http://citeseerx.ist.psu.edu/viewdoc/download?doi=10.1.1.140.7277&rep=rep1&type=pdf>>, 2008, pp. 1-15.

Yang, et al., "Semantic Image Browser: Bridging Information Visualization with Automated Intelligent Image Analysis", Retrieved at <<http://www.viscenter.uncc.edu/TechnicalReports/CVC-UNCC-06-02.pdf>>, 2006, pp. 1-8.

* cited by examiner

SEMANTIC SEARCH INTERFACE FOR DATA COLLECTIONS

BACKGROUND

As computing devices continue to become less expensive, more and more powerful, and as capacity of data storage devices continues to rapidly increase, more and more data is being generated and stored, oftentimes as structured or semi-structured datasets. A dataset is a collection of data that conforms to either a formal schema (in the case of conventional relational databases), or to an informal conceptual model of the contents (in the case of NoSQL databases, including loose-schemata, semi-formal-schemata, and schema-free conceptual models), wherein the formal schema and/or conceptual model is conventionally defined by the producer or maintainer of the dataset. As used herein, the term "schema" is intended to encompass both a formal schema as well as an informal conceptual model of contents of a dataset. As will be understood by one skilled in the art of dataset generation/maintenance, a schema defines the structure and content of the dataset.

As datasets are continually developed, the data community has moved towards making them available online; e.g., providing users with access to datasets by way of the World Wide Web. Currently, many of such datasets are made available or reside in the deep Web, which is not indexed by standard search engines. Accordingly, these datasets remain unavailable to most users. The United States government, however, has issued a mandate to allow access to government-related datasets to the general population. Further, the academic world is gradually transferring large datasets to publicly accessible computer clouds and university clusters (such as genome projects that aim to determine a complete genome sequence of an organism). Still further, private industry has developed new business models that make datasets available to others for certain fees or in exchange for other services. Moreover, technologies have been developed that facilitate sharing data with numerous applications or users that can process such data. An example of such technology is the Open Data Protocol (oData), which supports consumer querying of a dataset over the HTTP protocol and the provision of results of the query to a consumer in a variety of formats.

While allowing access to various datasets to the general population can be beneficial, the "drowning in data" issue faced by all is exacerbated. That is, there currently is no effective mechanism that allows users to quickly locate datasets that are of interest to the users.

SUMMARY

The following is a brief summary of subject matter that is described in greater detail herein. This summary is not intended to be limiting as to the scope of the claims.

Described herein are various technologies pertaining to generating a dataset summary that describes content and structure of a relatively large dataset for analysis by a human or computer executable application. A dataset comprises a plurality of entries that conform to a schema definition that is defined by the producer of the dataset, wherein the schema definition is exposed for consumers of the dataset. Furthermore, the dataset may have metadata associated therewith that describes the content of the dataset, wherein this metadata is produced by the producer of the dataset. Generally, the metadata is in the form of unstructured text written in natural language, rendering it suboptimal for computer processing.

Pre-processing can be performed over the schema definition set forth by the producer of the dataset, wherein pre-processing can include enriching the schema definition in a structured manner. For instance, the schema definition can be enriched through utilization of thesauri data, previously identified mappings, and inclusion of automatic annotations. In other words, words/phrases utilized in the schema definition can be replaced with synonyms from a thesaurus, wherein the synonyms are more suitable for Natural Language Processing (NPL) techniques than the words/phrases replaced by the synonyms. Further, data mapping can be employed to identify mappings between two data models: the schema definition set forth by the producer of the dataset and a structure suitable for machine learning/natural language processing. Moreover, annotations can be added to words, phrases, rules, or the like in the schema definition, wherein such annotations are pre-defined.

Natural language processing (NLP) technologies can thereafter be employed over the enriched schema definition to generate a semantic summary of the content and structure of the dataset, wherein the enriched summary is reduced to provide a succinct overview of the dataset. This semantic summary has a pre-defined structure that is uniform across semantic summaries of datasets, thereby readily allowing the semantic summaries to be efficiently searched over and organized. Additionally, NLP technologies can be employed over the metadata in connection with generating the semantic summary of the dataset. For example, NLP technologies can be employed to perform automatic summarization of unstructured text provided by the producer of the dataset. Additionally, NPL technologies can perform natural language generation, which is the process of generating natural language from a machine representation system such as the schema in the dataset.

In addition to generating the semantic summary of the dataset, machine learning techniques and/or natural language processing techniques can be utilized to extract at least one entry from the dataset that is exemplary of the content of such dataset. In an example, a dataset may include automobiles that are indexed by make, model, color, year, etc. Accordingly, for instance, content of the dataset can be summarized based upon a product, a supplier, and a brand. This short semantic summary, however, may be insufficient to distinguish the content of the dataset from contents of other datasets, such as a dataset that includes tools that can be indexed by products, suppliers and brands. An exemplary entry in either of the datasets when provided to a user, however, can distinguish the contents of one of the datasets from the contents of the other dataset.

In addition, to further describe the content of the dataset, accessible resources, such as a search engine index or the World Wide Web, can be accessed, and an image, video, or audio file pertaining to the content of the dataset or the at least one exemplary entry can be located and packaged with the semantic summary and the exemplary entry, thereby providing a more fully expressive summary of the contents of the dataset. In an example, the dataset may be a bookseller, and an exemplary entry that describes content of the dataset may be a particular book that has a certain author and publication date. An image of the book cover can be located by accessing the index of a search engine, and this image of the book cover can be associated with the semantic summary and the exemplary entry that has been extracted from the dataset. The semantic summary, the exemplary entry, and the data located from accessible resource(s) can be packaged as a summary of the dataset.

The above process can be repeated for numerous datasets, such that a plurality of dataset summaries is generated for a plurality of different datasets. These dataset summaries can be visualized in a semantic search interface, such that a consumer can readily identify what type of content is included in numerous datasets. In an example, a dataset marketplace can be provided, where a number of different datasets that have different types of data and are structured differently can be made available to users and/or computer executable applications by way of an Internet browser (e.g., as a cloud computing, data service). Pursuant to an example, machine learning techniques and NLP techniques can be utilized to analyze summaries of the datasets and/or entries of the datasets to compute a measure of similarity between datasets. This can allow for similar datasets to be clustered together, such that if a user issues a query related to a certain topic, the cluster of datasets that includes content pertaining to such content can be returned to the user responsive to receipt of the query. In a visualization of datasets in a cluster or between clusters, datasets are spatially separated based at least in part upon the computed measure of similarity between datasets. For instance, two datasets that are deemed to be very similar can be placed spatially proximate to one another, while datasets that are deemed to be dissimilar are displayed spatially further apart from one another.

In addition, with respect to datasets that are similar, exemplary entries can be selectively extracted from the datasets that facilitate distinguishing content of one dataset versus a content of a similar dataset. Again, machine learning technologies and/or NLP technologies can be utilized in connection with selectively extracting distinguishing entries from the datasets. As a result of this visualization, a user can quickly ascertain what datasets "are about", and can selectively choose a dataset based at least in part upon the summary and the distinguishing entries that are visually presented to the user.

Other aspects will be appreciated upon reading and understanding the attached Figs. and description.

DETAILED DESCRIPTION

Figure 1:
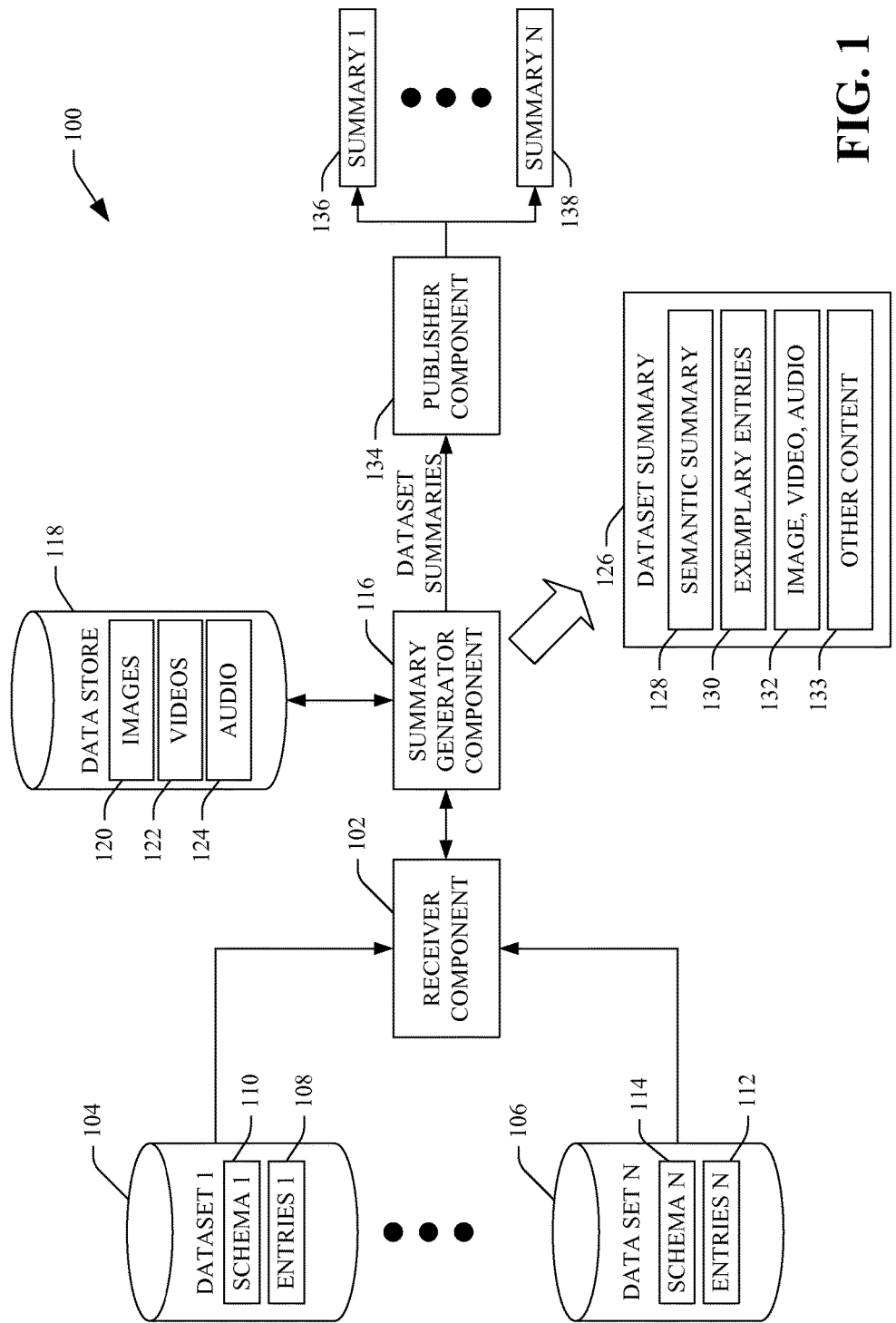
FIG. 1 is a functional block diagram of an exemplary system that facilitates generating a summary of a dataset.

Various technologies pertaining to summarizing contents of relatively large datasets will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "data model" is intended to encompass a dataset schema. Moreover, as used herein, the term "entry" is intended to encompass a database instance, as well as database tuple (in the case of relational databases) and database rows, documents, nodes, and edges (in the case of NoSQL databases). Additionally, the term "schema" is intended to encompass both formal schemas and informal conceptual models of contents of a dataset, including but not limited to conceptual models that aid in describing content and structure in semi-schematized datasets, schema-free datasets, loosely schematized datasets, datasets with rapidly changing schemas, and/or the like.

Referring now to FIG. 1, an exemplary system 100 that facilitates generating dataset summaries for a plurality of relatively large datasets for exposure to users and/or applications is illustrated. As used herein, the term "relative large dataset" can be a dataset with at least one thousand entries, a dataset with at least one hundred thousand entries, or a dataset with at least one million entries.

The system 100 comprises a receiver component 102 that receives a first dataset 104 through an nth dataset 106. The first dataset 104 includes first entries 108 that conform to a first dataset schema 110, while the nth dataset 106 includes an nth entries 112 that conform to an nth dataset schema 114 (different from the first schema 110). As used herein, a dataset schema is a formalized description (written in a formal or semi-formal language, such as the Entity Relationship Diagram) of the structure of a dataset. With more specificity, a dataset schema includes one or more formulas (rules) that specify integrity constraints on the dataset. The schemas 110 and 114 can be exposed by producers of the datasets 104-106 and, generally, can define the structure and content of the entries 108-112 in the respective datasets 104-106. In another exemplary embodiment, at least one of the schemas 110 and 114 can be inferred (e.g., through database engineering) based at least in part upon entries in the datasets 104-106. Additionally, while not shown, unstructured text may accompany the schemas 110-114, where such unstructured text is set forth by the respective producers of the datasets 104-106 to describe the structure and/or content of the dataset in an informal manner to consumers that may wish to access and utilize data in such datasets 104-106. Further, while not shown, metadata may accompany the schemas 110-114 set forth by the producers of the datasets. Metadata can be represented using standards for metadata capture, such as standards used by Dublin Core or Library of Congress to describe the content of the datasets. Typically, metadata is provided in plain text or in some structured modeling language such as XML, RDF, or the like. The entries 108 and 112 in the respective datasets 104-106 may be any suitable entries. For instance, the first dataset 104 may be configured to include data pertaining to weather indexed by certain geographic regions and time. In another example, the first dataset 104 may include entries pertaining to automobiles that are indexed by supplier, manufacturer, brand, etc. It is thus to be understood that the date sets 104-106 may include numerous types of data structured in a variety of manners from a plurality of different sources.

A summary generator component 116 is in communication with receiver component 102. The summary generator component 116 receives the plurality of datasets 104-106 and generates dataset summaries for each of the plurality of datasets 104-106. Pursuant to an example, the summary generator component 116 can receive the first dataset 104 and can perform pre-processing on the first dataset 104. With more particularity, the summary generator component 116 can analyze the first schema 110 corresponding to the first dataset 104 and can enrich the first schema 110 through utilization of a computer-processable dictionary, a computer-processable thesaurus, a computer-processable listing of predefined annotations, and/or predefined mappings between the structure of the first dataset 104 defined in the first schema 110 and a predefined schema structure. The act of enriching the first schema 110 includes the utilization of standard vocabularies to establish commonality across schemas of different datasets that are desirably summarized.

In an example, words/phrases utilized in the first schema 110 can be replaced with synonyms from a thesaurus, wherein the synonyms are more suitable for Natural Language Processing (NLP) techniques than the words/phrases replaced by the synonyms. Further, data mapping can be employed to identify mappings between two data models: the dataset schema definition, referred to herein simply as schema definition set forth by the producer of the dataset, and a structure (schema) suitable for machine learning/natural language processing. Moreover, annotations can be added to words, phrases, rules, or the like in the schema definition, wherein such annotations are pre-defined. Performing such pre-processing can save computational effort by reusing mappings and annotations that have been previously located.

The summary generator component 116 can subsequently utilize NLP techniques and/or various machine learning techniques to analyze the enriched schema in connection with generating a succinct overview of the schema (referred to herein as a "semantic summary"), where most relevant portions of the enriched schema are identified for utilization of the semantic summary. Thereafter, the summary generator component 116 can analyze the enriched schema through NLP and/or machine learning technologies to selectively extract portions of the enriched schema that are deemed to be most relevant. This can be undertaken, for instance, through automatic summarization that is currently available by way existing NLP algorithms. Additionally or alternatively, the enriched schema can be in the form of a tree structure or graph, and graph-based central concept extraction can be employed to identify most relevant portions of the enriched schema to present to users and/or applications that desire access to the first dataset 104.

Thereafter, the summary generator component 116 can utilize NLP technology to analyze the first entries 108 and selectively extract at least one entry from the first entries 108 that is representative of the content of the dataset 104. For instance, this at least one entry can be displayed together with the semantic summary generated by the summary generator component 116 to provide a high-level overview of the contents of the dataset 104. The at least one entry that is extracted from the first entries 108 by the summary generator component 116 can describe and represent the first dataset 104.

It may also be desirable to provide additional information that describes the at least one entry or the other content in the dataset 104. Accordingly, for example, the summary generator component 116 can access a data store 118 that comprises images 120, videos 122, and audio files 124. The summary generator component 116 can perform a search over the contents of the data store 118 based at least in part upon the at least one exemplary entry extracted from the first dataset 104. For instance, the summary generator component 116 may locate at least one image, at least one video file, or at least one audio file that is descriptive of the at least one entry that was extracted from the first entries 108 in the first dataset 104. Additionally, the summary generator component 116 can locate hyperlinks, tags, DBPedia entries, hyperlinks, or other information related to at least one entry of the first dataset 104. For example, the data store 118 may be a search engine index, and the summary generator component 116 can perform a search over such index to locate appropriate content that is germane to the at least one entry extracted from the first entries 108 of the first dataset 104. Of course, the data store 118 may be any accessible resource, including a web page, tags, image libraries, video collections, etc.

Thus, the summary generator component 116 can output a dataset summary 126 that is descriptive of the content and structure of the first dataset 104, and wherein such dataset summary 126 has a structure that is uniform across all dataset summaries generated by the summary generator component 116. It is to be understood that the summary generator component 116 does not publish the dataset summary 126—rather, the dataset summary 126 is generated by the summary generator component 126 and is shown here for the purposes of explanation. The dataset summary 126 includes the semantic summary 128 generated by the summary generator component 116, one or more exemplary entries 130 extracted from the first entries 108 of the first dataset 104 by the summary generator component 116, at least one image, video file or audio file 132 (retrieved from the data store 118 based at least in part upon the one or more entries 130 extracted from the dataset 104 by the summary generator component 116), and/or other content 133 (which is intended to include text, tags, hyperlinks, DBPedia entries, etc.). The summary generator component 116 can generate dataset summaries for each of the datasets 104-106 received by the receiver component 102.

A publisher component 134 is in communication with the summary generator component 116 and publishes a plurality of dataset summaries 136-138 for the respective datasets 104-106. For example, the publisher component 134 can publish the dataset summaries 136-138 on a Web server, such that user can employ a browser to access the Web server and visually review the dataset summaries 136-138. If the user is interested in a particular dataset, the user can select the appropriate summary for the dataset and can access the dataset thereafter. Further, as the structure of the dataset summaries 136-138 is uniform across all the summaries 136-138, the summaries 136-138 can be searched over and processed readily by computer executable applications. Pursuant to an example, the publisher component 134 can publish the summaries 136-138 in accordance with the Open Data Protocol (oData), the resource description framework (RDF) format, the Atom Publishing Protocol format, the JSON format (including BSON, GeoJSON, JSONP, JSON-RPC, SOAPjr, JsonML), plain XML format, the Web Ontology Language format, or other suitable data interchange format. When published in such format, the summaries 136-138 can be processable by different types of computer executable applications.

In an exemplary embodiment, the system 100 may be utilized in connection with a dataset marketplace, where different dataset providers can publish their datasets for centralized access to those that wish to consume entries from the datasets for research, educational, or business activities. This data marketplace can be accessible to users or computer executable applications by way of the Internet, such that the summaries 136-138 can be searched over in an Internet-accessible cloud computing service. Because the summaries 136-138 succinctly and semantically describe the contents of the datasets 104-106, users or applications can readily locate datasets that are relevant to a particular task. In an example, fees can be charged to the providers of the datasets for hosting of the datasets at the data marketplace, and/or fees can be charged to consumers of the datasets at the data marketplace.

Figure 2:
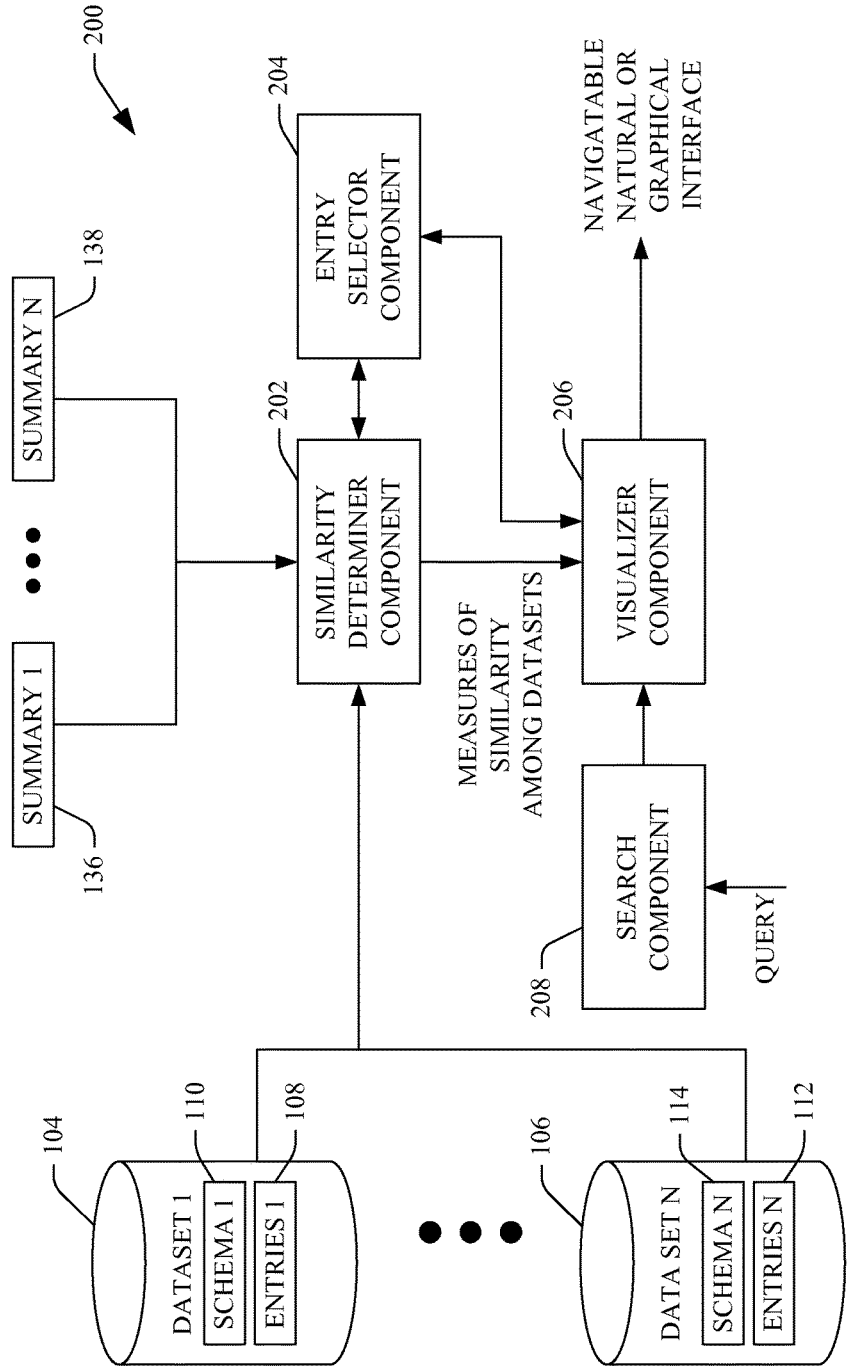
FIG. 2 is a functional block diagram of an exemplary system that facilitates presenting a navigable graphical or natural user interface to a user that includes numerous dataset summaries.

With reference now to FIG. 2, an exemplary system 200 that facilitates generating a visualization of a dataset collection is illustrated. The dataset collection comprises the datasets 104-106. The system 200 comprises a similarity determiner component 202 that receives the dataset summaries 136-138 and/or the datasets 104-106 themselves and clusters datasets based at least in part upon similarities between datasets. For instance, the system 200 includes a similarity determiner component 202 that can receive the summaries 136-138, which include the semantic summaries of the respective datasets 104-106, and can cluster the datasets 104-106 based at least in part upon such summaries 136-138. Pursuant to an example, the similarity determiner component 202 can utilize one or more NLP algorithms in connection with clustering the datasets 104-106 in various clusters. Additionally or alternatively, the similarity determiner component 202 can utilize one or more machine learning algorithms in connection with clustering the datasets 104-106. Of course, other clustering algorithms that are not classified as NLP algorithms or machine learning algorithms can also be employed to cluster the datasets 104-106. Thus, the similarity determiner component 202 can utilize one or more of language models, extract, transform and load algorithms, genetic clustering algorithms, Bayesian clustering, C-means, K-means, Fuzzy logic, or the like in connection with performing clustering of the datasets 104-106 based at least in part upon the summaries 136-138 that have been generated as described above.

In addition to clustering the datasets 104-106, the similarity determiner component 202 can compute a measure of similarity between datasets in the same cluster and/or in different clusters. One or more machine learning algorithms or NLP algorithms can be employed in connection with computing the measure of similarity between datasets, including but not limited to support vector machines, a vector space model, a Levenshtein algorithm, a Manhattan distance algorithm, or other suitable algorithm. Thus, for instance, the similarity determiner component 202 can compute pair-wise similarity values between two datasets in the collection of datasets 104-106, and the similarity determiner component 202 can generate a computer-implemented spatial representation of datasets (in accordance with a similarity gradient) in the dataset collection 104-106 based at least in part upon these measures of similarity between dataset pairs. In other words, the closer two datasets are in the computer implemented representation, the greater the similarity between the content of the datasets as computed by the similarity determiner component 202. In another exemplary embodiment, similarity amongst several datasets can be computed, for instance, through reification, where datasets are combined into a single unit, and thereafter compared with another dataset. Reification can apply this process recursively, thereby encompassing similarity computations across any suitable number of datasets.

The system 200 further comprises an entry selector component 204 that can analyze contents of the datasets 104-106 and select exemplary entries from such datasets 104-106 that help distinguish a dataset from other datasets. In an example, the first dataset 104 may pertain to a bookseller that sells contemporary works, while the nth dataset 106 is produced by an antique bookseller that sells works authored prior to the $18^{th}$ century. Semantic summaries corresponding to these datasets 104 and 106 may be somewhat similar, as in this example, both datasets include information pertaining to books. To distinguish contents of the datasets 104-106, however, the entry selector component 204 can selectively extract entries from the datasets 104-106 that help to distinguish the content of the first dataset 104 from the nth dataset and vice versa.

Therefore, for example, the entry selector component 204 may select an entry from the first dataset 104 that pertains to a current best-selling book, while the entry selector component 204 may select an entry from the nth dataset 106 pertaining to a book written in the 11th century. Accordingly, while the similarity determiner component 202 can compute a similarity metric between the datasets 104-106 at a high level, the entry selector component 204 can analyze individual instances in the datasets 104-106 and can compute difference values that indicate a measure of difference between selected entries. Thus, output of the entry selector component 204 may include similarity values for the datasets 104-106 in the dataset collection as well as subsets of distinctive exemplary instances in the datasets 104-106 that serve to differentiate among similar datasets in, for instance, a given context. Context, for example, can be defined as any participating entity in the semantic summary of the dataset. In the example provided above with respect to the bookseller, possible context may be publishers, authors and genre. Therefore, the entry selector component 204 can locate exemplary distinguishing instances from the datasets 104-106 as a function of a particular context which may be defined by a user or defined by the semantic summaries in the dataset summaries 136-138.

The system 200 may additionally include a visualizer component 206 that visualizes the dataset summaries 136-138 together with exemplary distinguishing entries from the datasets 104-106 (selected by the entry selector component 204) on a display screen in spatial relation to one another based upon the measures of similarity between datasets computed by the similarity determiner component 202. Accordingly, the visualizer component 206 may output a navigable graphical user interface that can include links to the datasets 104-106, a spatial distribution that represents similarities that exist between distinct datasets, as well as the summaries 136-138 of the datasets 104-106 together with the distinguishing exemplary entries. The visualizer component 206 can render the navigable graphical interface in a variety of formats including a graphical user interface, a natural user interface (which can allow for navigation within a collection), textual description to facilitate indexing and keyword search, comma separated values, file formats to facilitate integration amongst various applications, audio, as well as semantic Web compatible languages such as RDF, oData, and JavaScript object notation.

The system 200 may optionally include a search component 208 in communication with the visualizer component 206. The search component 208 can receive a query from a user, wherein the query may be a natural language query, a Boolean query, or other suitable query. The search component 208 may then search over the representation of the datasets 104-106 output by the similarity determiner component 202 and/or the entry selector component 204 to locate a dataset or cluster of datasets that is germane to the query. The visualizer component 206 may then cause the navigable graphical interface to be displayed to the issuer of a query, such that a most relevant dataset summary is presented in a center of the visualization while other related datasets summaries (summaries of datasets that are clustered with the most relevant dataset) are graphically spatially presented in the graphical interface based at least in part upon the similarities between the datasets computed by the similarity determiner component 202.

Using the navigable graphical interface, the user may select one or more of the dataset summaries presented to the user, which can cause a dataset represented by the selected dataset summary to be made available to the user. Additionally or alternatively, selection of a dataset summary representative of a dataset can cause the navigable graphical interface to redisplay dataset summaries. For instance, the user may select the dataset summary that is not the centermost summary included in the visualization generated by the visualizer component 206. Responsive to the visualizer component 206 receiving such selection, the visualizer component 206 can regenerate the visualization to cause the selected summary to be displayed in a center of the graphical user interface and may cause dataset summaries of similar datasets to be shown in the periphery of the navigable graphical interface.

Figure 3:
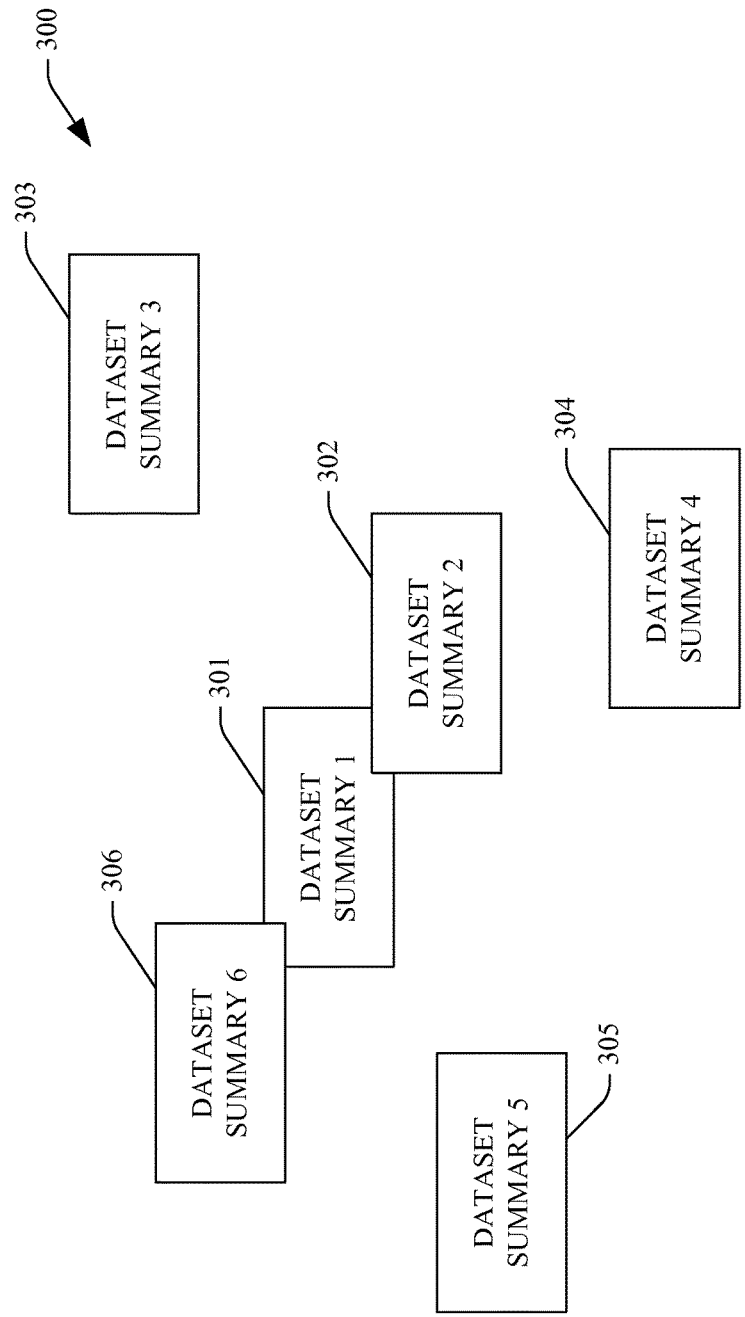
FIG. 3 is an exemplary visualization of a plurality of dataset summaries.

With reference now to FIG. 3, an exemplary visualization 300 that can be output by the visualizer component 206 is illustrated. The visualization 300 comprises a plurality of dataset summaries 301-306, which correspond to a first dataset, a second dataset, a third dataset, a fourth dataset, a fifth dataset, and a sixth dataset, respectively. As described above, the dataset summaries 301-306 may include semantic summaries of schemas that describe structure and content of the respective datasets, one or more exemplary entries in the datasets to illustrate to a viewer of the visualization 300 what the datasets are about, an image, a video, an audio file, or other content retrieved from an accessible resource that relate to one or more of the exemplary entries included in the datasets summaries 301-306, and further wherein at least one of the dataset entries in each of the datasets summaries 301-306 is selected to illustrate distinguishing features of the datasets with respect to a given context.

The datasets summaries 301-306 are spatially arranged in a manner that indicates similarity between the contents of the datasets summarized by the datasets summaries 301-306. For example, the first dataset summary 301 is shown relatively proximate to the second dataset summary 302, while the third dataset summary 303 is shown at a greater distance from the first dataset summary 301 than the second dataset summary 302. This indicates that a first dataset (represented by the first dataset summary 301) is more similar to the second dataset (represented by the second dataset summary 302) than the first dataset is to the third dataset (represented by the third dataset summary 303).

Here, the visualization 300 is shown as the plurality of datasets summaries 301-306, wherein each of these datasets summaries 301-306 may be displayed as a link or a selectable icon. In another embodiment, selection of one of the dataset summaries can cause the visualization to be regenerated, such that the selected dataset summary is shown at the center of the visualization 300. Additionally or alternatively, selection of a dataset summary can cause contents of the dataset that were presented by the dataset summary to be displayed to the user.

Figure 4:
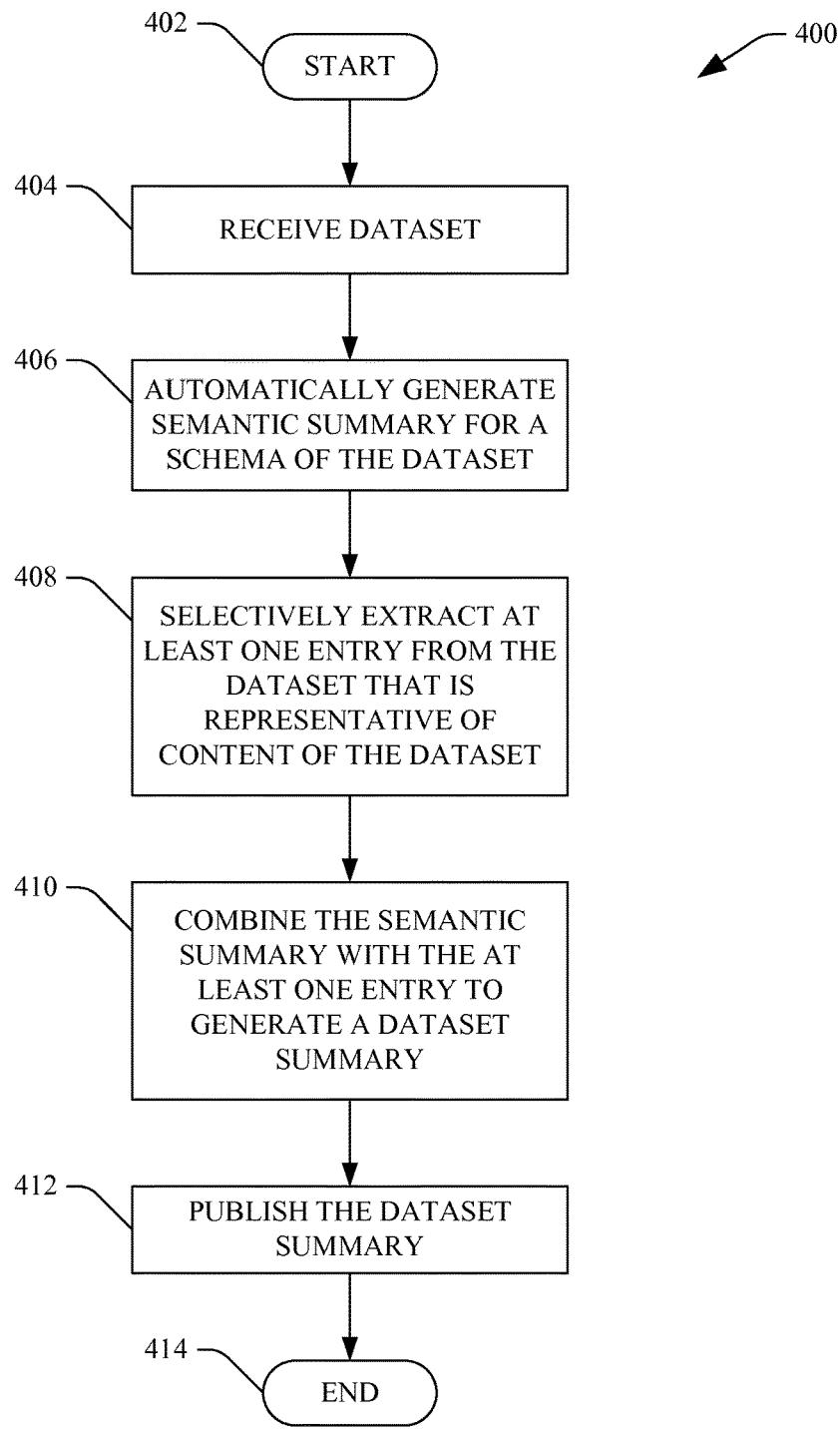
FIG. 4 is a flow diagram that illustrates an exemplary methodology for generating and publishing dataset summaries.
Figure 5:
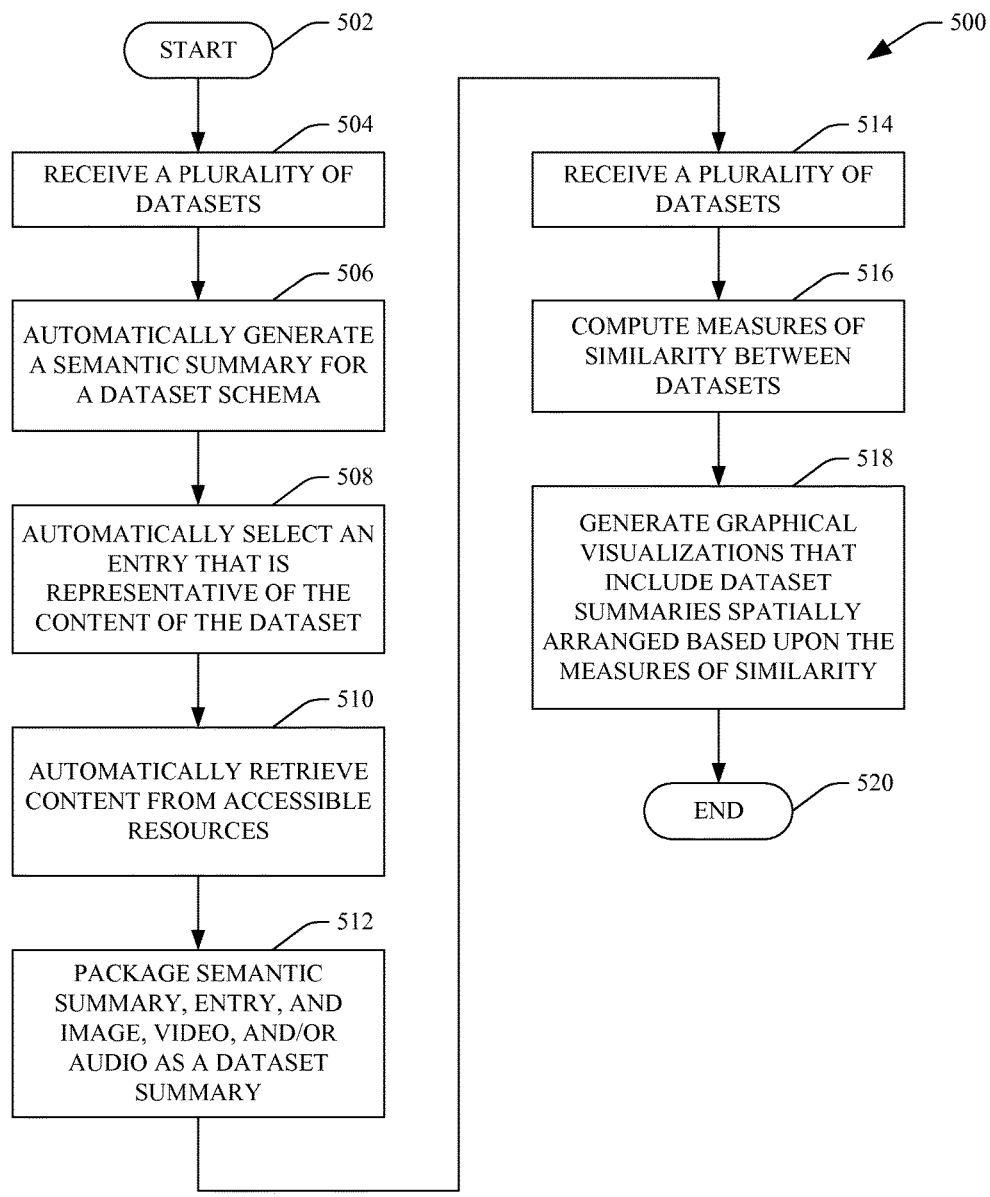
FIG. 5 is a flow diagram that illustrates an exemplary methodology for generating a graphical visualization of dataset summaries.

With reference now to FIGS. 4-5, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or other suitable data storage medium. As used herein, the term "computer-readable medium" is not intended to encompass a propagated signal.

With reference now to FIG. 4, an exemplary methodology 400 that facilitates generating a summary of a dataset is illustrated. As indicated above, datasets may be relatively large such that a dataset may include thousands, hundreds of thousands, or even millions of entries. Accordingly, summarization of these datasets may be important, particularly in the context of a dataset marketplace, where numerous datasets are made available to users/programs that wish to consume these datasets.

The methodology 400 starts at 402, and at 404 a dataset is received. A schema that defines the structure and content of the dataset is exposed, and optionally the dataset may have metadata in the form of unstructured natural language assigned thereto that describes the content of the dataset. Still further, the dataset includes a plurality of entries that conform to the aforementioned schema. At 406, a semantic summary for the schema is automatically generated. The semantic summary can be automatically generated by first performing a preprocessing step on the schema, which can include providing annotations to the schema, swapping out words in the schema for a predefined set of words, noting particular predefined mappings, etc. The result of such preprocessing can be an enriched schema. Thereafter, the resultant enriched schema can be minimized such as to provide a succinct overview of the schema, where only particularly relevant components of the schema (e.g., that may be relevant to the particular context) are presented. One or more clustering algorithms, NLP algorithms, or machine learning algorithms can be utilized in connection with generating this succinct semantically rich summary of the schema.

At 408, at least one entry is selectively extracted from the dataset, wherein the at least one entry is representative of the content of the dataset. In addition, the at least one entry can be selected such as to facilitate distinguishing the content of the dataset with content of other datasets.

At 410, the semantic summary is combined with the least one extracted entry to generate a dataset summary. Furthermore, an image file, an audio file, a video file, text, hyperlink(s), tags, DBPedia entries, or other suitable data may optionally be retrieved by searching over an accessible resource for content that is relevant to the at least one entity that was extracted at 408. This image file, audio file, video file, text, hyperlink(s), DBPedia entries, etc. may be included in the dataset summary. At 412, the dataset summary is published, wherein such dataset summary may be published in a variety of suitable formats such as RDF, tuple sets, oData, natural language descriptions, audio and graphical renditions, or the like. The methodology 400 completes at 414.

Turning now to FIG. 5, an exemplary methodology 500 that facilitates generating a graphical visualization that includes datasets summaries spatially arranged based upon measures of similarity therebetween is illustrated. The methodology 500 starts at 502, and at 504 a plurality of datasets are received. A plurality of datasets are structured in accordance with a plurality of respective dataset schemas that define the structure and content of the datasets. At 506, a semantic schema description is automatically generated for a dataset. As described above, generating the semantic schema description can include first performing pre-processing in connection with generating an enriched schema, and thereafter generating a succinct semantic summary through clustering, NLP, and/or machine learning algorithms.

At 508, at least one entry from the plurality of entries in the dataset is automatically selected, wherein the at least one entry is representative of content of the dataset with respect to particular context (e.g., a search performed by a user).

At 510, content, such as an image, a video, an audio file, hyperlink, text, a DBPedia entry, tags, etc., is automatically retrieved from an accessible resource based at least in part upon the least one entry selected at 508. At 512, the semantic summary, the at least one entry and the image, video and/or audio file is packaged to create a dataset summary. This can be included, in example, in an icon that is selectable by a user.

At 514, a plurality of dataset summaries that correspond to the plurality of datasets received at 504 is received. At 516, measures of similarity between datasets are computed based at least in part upon the receipt of the plurality of dataset summaries. These measures of similarity may also be computed based at least in part upon content of the plurality of datasets.

At 518, a graphical visualization that includes the dataset summaries spatially arranged based upon the measures of similarity between the respective datasets is generated. The methodology 500 completes at 520.

Figure 6:
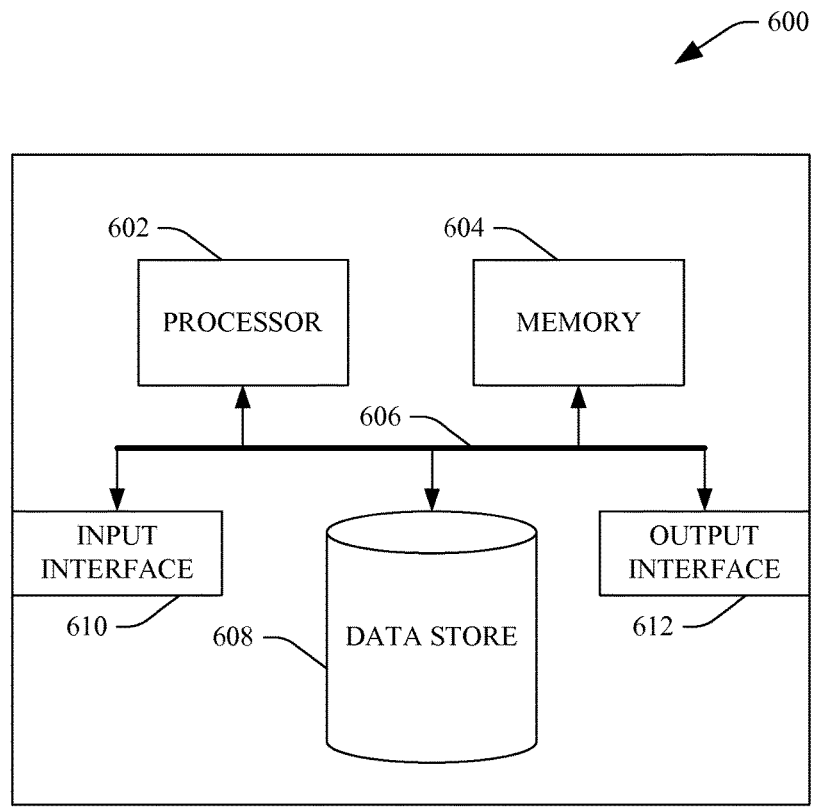
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports generating dataset summaries. In another example, at least a portion of the computing device 600 may be used in a system that supports visualizing dataset summaries. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store semantic summaries, dataset summaries, similarity values, images, videos, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, semantic summaries, dataset summaries, similarity values, images, videos, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed and/or virtualized system. Thus, for instance, several devices may be in communication by way of a network connection and may collectively perform tasks described as being performed by the computing device 600.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   receiving a dataset, the dataset comprising content, the content includes a plurality of entries;
   receiving a dataset schema of the dataset, the dataset schema definition provided by a producer of the dataset, the dataset schema being a description of a structure of the dataset written in a formalized language, wherein the dataset schema comprises rules that specify integrity constraints on the dataset;
   receiving metadata assigned to the dataset, the metadata describes the content of the dataset, wherein the metadata comprises unstructured text written in natural language;
   responsive to receiving the dataset, the dataset schema, and the metadata, generating a summary of the dataset based upon the dataset schema, the metadata, and the dataset, wherein generating the summary of the dataset comprises:
      generating a semantic summary of the dataset based upon the metadata and the dataset schema, the semantic summary of the dataset summarizes the content of the dataset, wherein generating the semantic summary comprises:
         identifying mappings between the dataset schema and a second, predefined schema; and
         generating a summary of the unstructured text through use of computer-implemented natural language processing (NLP), wherein the semantic summary comprises the summary of the unstructured text; and
      extracting an entry from the plurality of entries in the dataset, the entry identified as being representative of the content of the dataset, wherein the summary of the dataset comprises the semantic summary of the dataset and the entry extracted from the plurality of entries; and publishing the summary of the dataset to a web server that comprises several summaries of several datasets, wherein each of the several summaries have a same format, and further wherein the several datasets have different dataset schemas.

2. The method of claim 1, wherein generating the summary of the data set further comprises automatically performing a search over web-accessible content based upon at least one of the semantic summary of the dataset or the entry to a search result, the summary of the dataset further comprising the search result.

3. The method of claim 2, wherein the search result is one of an image or audio file corresponding to the entry.

4. The method of claim 2, wherein the search result is a video corresponding to the entry.

5. The method of claim 2, wherein the search result is one of an annotation, a hyperlink, a tag, or plain text corresponding to the entry.

6. The method of claim 1, further comprising rendering the summary of the dataset on the display screen in accordance with one of the Open Data Protocol, the Atom Publishing Protocol format, the JSON format, plain XML format, the Web Ontology Language format, or the Resource Description Framework format.

7. The method of claim 1, further comprising:
computing measures of similarity between the several datasets;
computing a plurality of clusters based at least in part upon the measures of similarity, a cluster in the plurality of clusters comprises the dataset; and
displaying a plurality of dataset summaries that are respectively representative of datasets in the cluster, wherein the dataset summaries are spatially arranged based at least in part upon measures of similarity between the datasets in the cluster.

8. The method of claim 7, further comprising:
extracting entries from the datasets in the cluster that are indicative of features that distinguish the datasets in the cluster from other datasets in other clusters, wherein the plurality of dataset summaries respectively comprise the entries extracted from the datasets in the cluster.

9. The method of claim 8, wherein at least one computer-executable algorithm is utilized to selectively extract the entries from the datasets in the cluster.

10. The method of claim 1, wherein at least one of a natural language processing algorithm or clustering algorithm is employed to generate the semantic summary.

11. The method of claim 1, further comprising:
causing the summary of the dataset to be viewable by way of a computer-executable application in a cloud-based dataset marketplace.

12. A system, comprising:
at least one processor; and
memory comprising instructions that, when executed by the at least one processor, cause the at least one processor to perform acts comprising:
receiving a dataset, the dataset comprising a plurality of entries;
receiving a dataset schema for the dataset, the dataset schema defined by a developer of the dataset, wherein the dataset schema defines a structure of the dataset and is written in a formalized language, wherein the dataset schema comprises rules that specify integrity constraints on the dataset;
generating a summary of the dataset based upon the dataset schema for the dataset, wherein generating the summary of the dataset comprises:
a) generating a semantic summary of the schema, wherein generating the semantic summary of the schema comprises replacing words in the schema with synonyms from a predefined computer-implemented thesaurus such that the semantic summary of the schema has a vocabulary that is common across semantic summaries of other datasets; and
b) selecting an entry from the plurality of entries that is representative of the plurality of entries in the dataset, wherein the summary of the dataset comprises the semantic summary of the schema and the entry selected from the plurality of entries; and
publishing the summary of the dataset to a web server such that the summary of the dataset is accessible to users and computer-executable applications, wherein the summary of the dataset is included at the web server in a plurality of summaries of several datasets, wherein the summaries of the several datasets have a uniform structure, and further wherein the datasets summarized by the plurality of summaries have dataset schemas that are different from the dataset schema of the dataset.

13. The system of claim 12, wherein generating the summary of the dataset further comprises:
retrieving at least one of an image file, a video file, an audio file, an annotation, a hyperlink, a tag, or plain text from a data repository; and
including the at least one of the image file, the video file, the audio file, the annotation, the hyperlink, the tag, or the plain text in the summary of the dataset.

14. The system of claim 12, wherein generating the summary of the dataset further comprises selecting the entry to represent differences between the dataset and another dataset in the several datasets.

15. The system of claim 12, the acts further comprising visualizing the summary of the dataset together with the summaries of the several datasets.

16. The system of claim 15, the acts further comprising:
computing a measure of similarity between two datasets; and
causing respective summaries of the two datasets to be displayed, wherein a distance between the summaries of the two datasets is based at least in part upon the measure of similarity between the two datasets.

17. The system of claim 12, wherein the summaries of the several datasets are exposed in a dataset marketplace.

18. The system of claim 12, wherein generating the summary of the dataset further comprises utilizing machine learning, natural language processing, and/or clustering to generate the summary of the dataset.

19. A computer-readable medium comprising instructions that, when executed by a processor, cause the processor to perform acts comprising:
receiving a plurality of datasets that are structured in accordance with a plurality of different dataset schemas, each dataset in the plurality datasets having a plurality of entries that conform to a schema of the dataset;
generating a plurality of summaries for the plurality of datasets, wherein generating a summary for each dataset comprises:

generating an enriched schema by replacing at least one word or phrase in the dataset schema for the dataset with another word or phrase selected from at least one of a computer-processable thesaurus or a computer-processable dictionary;

generating a semantic summary of the dataset schema by selecting at least one word or phrase from the enriched schema; and selecting at least one entry from the plurality of entries in the dataset, wherein the at least one entry is representative of content of the dataset, wherein the summary for the dataset comprises the semantic summary of the dataset schema and the at least one entry, and further wherein each summary for each dataset has a uniform structure; and publishing the plurality of summaries to a web server.

20. The system of claim 12, the acts further comprising:

receiving unstructured text that is assigned to the dataset;

utilizing a computer-implemented natural language processing system, generating a summary of the unstructured text, the summary conforming to a predefined format, wherein the summary of the unstructured text is included in the summary of the dataset.

* * * * *